United States Patent
Cookman et al.

(10) Patent No.: US 7,020,674 B2
(45) Date of Patent: *Mar. 28, 2006

(54) DEVICE AND METHOD FOR PERFORMING MULTIPLE MODULUS CONVERSION USING INVERSE MODULUS MULTIPLICATION

(75) Inventors: Jordan C. Cookman, San Jose, CA (US); Ping Dong, Cupertino, CA (US)

(73) Assignee: Ess Technology Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/722,728

(22) Filed: Nov. 25, 2003

(65) Prior Publication Data

US 2004/0103134 A1    May 27, 2004

Related U.S. Application Data

(63) Continuation of application No. 10/085,760, filed on Feb. 28, 2002, now Pat. No. 6,697,831.

(51) Int. Cl.
*G06F 7/38* (2006.01)

(52) U.S. Cl. ....................................... 708/491
(58) Field of Classification Search ............... 708/204, 708/491, 650, 653, 654; 375/222
See application file for complete search history.

(56) References Cited

U.S. PATENT DOCUMENTS

| | | | | |
|---|---|---|---|---|
| 5,859,877 A | * | 1/1999 | Betts et al. | 375/298 |
| 6,034,991 A | * | 3/2000 | Zhou et al. | 375/222 |
| 6,065,030 A | * | 5/2000 | Zhang | 708/491 |

* cited by examiner

*Primary Examiner*—Chuong D Ngo
(74) *Attorney, Agent, or Firm*—Stevens Law Group, P.C.

(57) ABSTRACT

A method and device are provided that allow computation of multiple modulus conversion (MMC) outputs using little or no division operations. Instead of division operations, multiplication and logical shift operations are used to produce pseudo-quotients and pseudo-remainders, which may be corrected in a final step to produce correct MMC outputs. This allows for more efficient implementation, since division is typically less efficient than multiplication and logical shift. The method and device operate on MMC inputs that may be partitioned into sub-quotients of varying numbers of digits in any numbering system. The multiplication and logical shift operations are performed on each of the sub-quotients according to a procedure derived from long-division techniques.

7 Claims, 4 Drawing Sheets

DEVICE AND METHOD FOR PERFORMING MULTIPLE MODULUS CONVERSION USING INVERSE MODULUS MULTIPLICATION

This application is a continuation of U.S. Ser. No. 10/085,760, filed Feb. 28, 2002, and entitled 'Device and Method for Performing Multiple Modulus Conversion Using Inverse Modulus Multiplication', now U.S. Pat. No. 6,697,831.

BACKGROUND

The invention relates generally to mathematical algorithms for data transmissions, and, more particularly, to algorithms for performing modulus conversions of transmitted data.

Conventional computer systems transmit data using modems connected to telephone lines or other communication media. Generally, there are two types of modem in such a system, server modems and client modems. Signal directions are generally referred to in this area as downstream, from server modems to client modems, and upstream, from client modems to server modems. Server modems are generally used by Internet service providers (ISPs) for transmitting signals downstream to and receiving signals upstream from client modems. Similarly, client modems are generally used by customers of ISPs, and are configured to send signals upstream to and receive signals downstream from ISP server modems.

Each type of modem typically uses an analog to digital converter and a digital to analog converter, (A/D-D/A converter) typically combined into a single device called a CODEC. This CODEC converts incoming analog signals to digital signals that can be processed by a signal-processing unit and converts digital signals from a signal processing unit to outgoing analog signals that can be transmitted on a communication medium such as a telephone line. In many cases, server modems do not have their own CODECs, but rely on the CODECs within the telephone network to do the conversions. The signal processing unit, sometimes referred to as a "data pump," is conventionally a dedicated chip known as a Digital Signal Processor (DSP), which is preprogrammed with algorithms for converting the digital signals into information bits and vice versa.

The modem may also include a second dedicated chip, sometimes called the "controller," which is a microcontroller preprogrammed to control the DSP, convert the information bits from the DSP into data usable by the computer system, and convert data from the computer system into information bits for the DSP. The controller may implement certain schemes to correct errors in the information bits, and may also implement certain schemes to compress the information bits for more efficient transmission. Some modems eliminate the dedicated controller chip by performing the control functions on the host computer system. These modems are commonly referred to as controllerless modems. Other modems may perform some or all of the signal processing functions on the host computer system using techniques commonly referred to as Host Signal Processing (HSP.)

Modem modulation schemes used in modem communication systems are typically defined in terms of analog signals. Many modulation schemes operate by altering the characteristics of a sine wave, the frequency of which is referred to as the carrier frequency. For example, Quadrature Amplitude Modulation (QAM) operates by altering the amplitude and phase of a carrier frequency at a fixed rate. Other modulation schemes operate without a carrier. For example, Pulse Coded Modulation (PCM) operates by directly altering the level of a signal at a fixed rate. In either case, this fixed rate is known as the baud frequency or symbol frequency. Since most modern modems use digital signal processing techniques, these analog signals must be converted to digital form using a sampling rate, which is often a multiple of the baud frequency. Thus, an integer number of samples can be thought of as representing a "baud" or "symbol." Depending on the modulation scheme and the sophistication of the algorithms it uses, the symbols, either individually or in groups, represent a certain number of information bits. The relationship between the information bits and the transmitted symbols is determined by a mapping scheme. The average number of information bits transmitted per second is commonly called the "data rate" or "bit rate."

Standard protocols for modem modulation schemes have been developed to improve compatibility in the telecommunications industry. The International Telecommunications Union (ITU), formerly the International Telegraph and Telephone Consultative Committee (CCITT), for example, has developed standard recommendations that evolve with the changing technology in the modem industry. Earlier recommendations such as V.21, V.22 and V.23 use frequency division multiplexing (FDM) for duplex communication. Newer recommendations such as V.32bis, V.34, V.90 and V.92 use echo cancellation for duplex communication. V.90 and V.92 describe duplex communication using PCM modulation in at least one direction. Modems designed according to V.90 or V.92 are sometimes called 56 kbps modems, referring to the maximum bit rate specified in the downstream direction. All modems implementing a particular recommendation must use specified modulation and mapping schemes when transmitting data across the data transmission system, in order to ensure interoperability among multiple vendors' products.

Modulation schemes typically define sets of allowable symbol parameters known as constellations. Mapping methods provide ways to represent information bits to be transmitted in terms of available points in the constellations. In both the V.90 and V.92 recommendations, multiple modulus conversion (MMC) is employed as a mapping scheme in order to map long frames of information bits onto multiple constellations of different sizes. In particular, the V.90 recommendation specifies MMC to be used in the downstream direction, from the server modem to the client modem. The V.92 recommendation specifies MMC to be used in both directions.

In conventional applications of MMC, input data is used to form a quotient, which is successively divided by a set of known moduli. The remainders of each division are used as the output of the process. This process is a great burden on a modem processor, because typically division operations require multiple cycles to perform. Also, typically the input data is larger than the modem processor can handle with one operation. To address these problems, several techniques have been developed to perform such calculations. One commonly used method uses a long division algorithm, whereby the incoming quotient is partitioned into several segments, each requiring a separate division operation.

In general, the MMC algorithm takes as input a number $Q_0$, a non-negative integer. In addition, the algorithm takes as input a plurality of moduli $Y_i$, where $1 \leq i \leq M$, which are all positive integers. Typically, $Y_i \geq 2$ and $Q_0 < Y_1 * Y_2 * \ldots Y_M$. The output of the algorithm is a set of values $Q_i$ and $R_i$, all non-negative integers, such that the following mathematical relationships hold:

$$Q_0 = Y_1 * Q_1 + R_1$$

$$Q_1 = Y_2 * Q_2 + R_2$$

...

$$Q_{i-1} = Y_i * Q_i + R_i$$

where $0 \leq R_i < Y_i$

Equivalently, $Q_0$ can be expressed in terms of the remainders produced by the MMC process and the respective moduli, $Y_i$:

$$Q_0 = R_1 + R_2 Y_1 + R_3 Y_1 Y_2 + \ldots + R_M Y_1 Y_2 \ldots Y_{M-1} + Q_M Y_1 Y_2 \ldots Y_M$$

Note that if $Q_0 < Y_1 * Y_2 * \ldots Y_M$, as is typically the case in a communication system, then $Q_M = 0$.

This algorithm requires that a division operation be done for each modulus, resulting in an output quotient and remainder for each modulus. The division corresponding to the final modulus $Y_M$ may be skipped if the input is limited as described above, so that $Q_M$ is known in advance to be 0. In that case, it can be shown that $R_M = Q_{M-1}$.

The following example illustrates the mathematical concept of MMC. All values are expressed in decimal format. In this example, the input $Q_0 = 933$, and there are four input moduli: $Y_1 = 5$, $Y_2 = 6$, $Y_3 = 7$, and $Y_4 = 8$. Here are the steps in the process:

1. Receive the input value of 933.
2. Divide the input by first modulus, 5. 933/5=quotient 186, remainder 3.
3. Divide new quotient by second modulus, 6. 186/6=quotient 31, remainder 0.
4. Divide new quotient by third modulus, 7. 31/7=quotient 4, remainder 3.
5. Divide new quotient by fourth modulus, 8. 4/8=quotient 0, remainder 4.

In an MMC process, the final outputs are 3, 0, 3 and 4 respectively. Note that the final division could have been skipped, since $Q_0 < Y_1 Y_2 Y_3 Y_4$ (933<1680) and therefore $Q_4 = 0$. The final remainder, $R_4$, is equal to the next-to-last quotient, $Q_3$.

In a conventional implementation of MMC, there are several system constraints. Typically, a device implementing MMC operates on values, in the binary, or Base 2, number system. However, MMC calculations can be implemented in any Base B number system. For example, the decimal number system (B=10) could be used. Typically, the device is constrained to perform arithmetic operations on values with a limited number of digits in the Base B numbering system. Since $Q_0$ may typically be represented with more digits than the device can handle in one calculation, "long division" methods are typically used to calculate the division result.

Long division is an iterative technique well known in mathematics. In *A course of mathematics*, by Charles Hutton, published in 1816, this type of division is described as follows: "... the dividend is resolved into parts, and by trial is found how often the divisor is contained in each of those parts, one after another, arranging the several figures of the quotient one after another, into one number." (pp. 18–19.) These days, long division is generally taught in elementary school as a pencil-and-paper method for doing division of large numbers (i.e., numbers that are difficult to divide in one's head.)

Long division is also well known in the art of computer science as a method for computing divisions of "large" numbers, defined as numbers with precision greater than can be accommodated in single registers or single calculations on the target computer. For example, in *The Art of Computer Programming*, 2nd ed., by Donald Knuth, published in 1981, a computer algorithm is presented to solve the general problem of long division. (pp. 255–260.) As in the pencil-and-paper method, computer long division requires partitioning one or more large numbers into a series of smaller numbers. Knuth's algorithm allows for these smaller numbers to be in any arbitrary base, so they could be the digits of a Base 10 number (as in the pencil-and-paper method taught by Hutton) or they could be in a Base that is a power of two, which is more likely since computers are typically designed for binary arithmetic. For example, the smaller numbers could be 4-bit short words (equivalently, digits in Base 16.)

MMC could be implemented using Knuth's long division algorithm directly. However, some simplifications can be made due to the nature of MMC. For example, Knuth's algorithm allows both the divisor and dividend to be large numbers, which are partitioned into smaller numbers. However, in MMC, the divisors are typically small enough to be handled by the computer directly, so only the dividends need to be partitioned. Also, in Knuth's algorithm the intermediate quotients are estimates that may have some error. Therefore, the intermediate remainders need to be tested to make sure they fall in the valid range. In a MMC application, the divisors and the partitions of the dividends can be constrained so that this test can be eliminated. One example of a MMC method using a simplified long division algorithm can be found in U.S. Pat. No. 6,065,030, Method and Apparatus for Implementing Short-Word Division Techniques in a Multiple Modulus Conversion Context, disclosed by Xuming Zhang.

To implement MMC using Zhang's technique, $Q_0$ is first partitioned into k+1 segments as follows:

$$Q_0 = Q_{0,0} + Q_{0,1} * B^{n(0)} + Q_{0,2} * B^{n(0)+n(1)} + \ldots Q^{0,k} * B^{n(0)+n(1)+\ldots+n(k-1)}$$

where n(j) is the number of digits in the base B numbering system used to represent $Q_{0,j}$.

The division of $Q_0$ by the first modulus $Y_1$ can be done by successively dividing each $Q_{0,j}$ by $Y_1$, as represented in the following pseudo-code:

$$R_{1,k+1} = 0$$

For($j=k; j \geq 0; j--$)

$$\{Q_{1,j} = \text{floor}((Q_{0,j} + R_{1,j+1} * B^{n(j)})/Y_1)\ R_{1,j} = Q_{0,j} - Q_{1,j} * Y_1\}$$

The floor( ) function is defined as the greatest integer less than or equal to its argument. The result of this division is a quotient and a remainder, as follows:

$$Q_1 = Q_{1,0} + Q_{1,1} * B^{n(0)} + Q_{1,2} * B^{n(0)+n(1)} + \ldots Q^{1,k} * B^{n(0)+n(1)+\ldots+n(k-1)}$$

$$R_1 = R_{1,0}$$

The remaining moduli $Y_i$ can be divided in a similar fashion:

$$R_{i,k+1} = 0$$

For($j=k; j \geq 0; j--$)

$$\{Q_{i,j} = \text{floor}((Q_{i-1,j} + R_{i,j+1} * B^{n(j)})/Y_i)\ R_{i,j} = Q_{i-1,j} - Q_{i,j} * Y_i\}$$

The final quotients and remainders are then expressed as:

$$Q_i = Q_{i,0} + Q_{i,1} * B^{n(0)} + Q_{i,2} * B^{n(0)+n(1)} + \ldots Q^{i,k} * B^{n(0)+n(1)+\ldots+n(k-1)}$$

$$R_i = R_{i,0}$$

Zhang also suggests that the long division loop (or, as he calls it "short word division") can be skipped whenever the quotient is small enough to be handled in a single conventional division operation.

Returning to the previous example where $Q_0=933$, $Y_1=5$, $Y_2=6$, $Y_3=7$, and $Y_4=8$, assume the following constraint exists: for conventional division operations, the quotient is limited to 2 digits and the divisor is limited to 1 digit.

The steps of Zhang's MMC process, constrained according to the above assumption, are as follows. First, $Q_0$, 933, is expressed as $(9*100)+(3*10)+3$. Then, long division is used to divide the input by a first modulus, 5.

a. Dividing 9 by 5, gives a quotient of 1, and remainder of 4.
  b. next, 4*10 is added to 3, giving 43
  c. Dividing 43 by 5, gives a quotient of 8, remainder 3
  d. next, 3*10 is added to 3, giving 33
  e. Dividing 33 by 5, gives a quotient 6, remainder 3
  f. The new quotient is then formed from the quotients, $(1*100)+(8*10)+6=186$
  g. The final remainder is 3.

This is the true quotient and remainder of 933/5, which is 186, remainder 3.

Next, long division is used to divide new quotient by a second modulus, 6. the quotient, 186, is expressed as $(1*100)+(8*10)+(6*1)$.

a. First, 1 is divided by 6, giving a quotient of 0, remainder 1.
  b. Next, 1*10 is added to 8, giving 18.
  c. Dividing 18 by 6, gives a quotient of 3, remainder 0.
  d. Next, 0*10 is added to 6, giving 6.
  e. Dividing 6 by 6, gives a quotient of 1, remainder 0.
  f. The new quotient is formed, $(0*100)+(3*10)+1=31$
  g. The final remainder is 0.

This is the true quotient and remainder of 186/6, which is 31, remainder 0.

Since last quotient of 31 has only 2 digits, conventional division can be used to divide the quotient by a third modulus, 7. Dividing 31 by 7, gives a quotient of 4, remainder 3.

Similarly, since the last quotient of 4 has only 1 digit, conventional division can be used to divide it by fourth modulus, 8. Dividing the quotient 4 by 8, gives a final calculated quotient of 0, remainder 4.

In this conventional method, the process checks the new quotient before doing the long division procedure. If the resultant quotient is less than a threshold, it does a conventional divide. This saves some divide instructions for the later divisions. The check, however, adds yet more processing cycles to the process.

The final remainders, which are the outputs of the MMC, are 3, 0, 3 and 4 respectively. So, Zhang's method results in the correct answer for this example.

Referring to the MMC parameters as specified in both V.90 and V.92 recommendations, M, the total number of moduli, also represents the number of symbols that are transmitted in a single data frame. For the downstream transmitter in V.90 and V.92, M=6. For the PCM upstream transmitter in V.92, M=12. For the downstream transmitter in V.90 and V.92, the values of $Y_i$ represent the number of signal point magnitudes contained in the signal point constellation that is associated with the $i^{th}$ phase of the data frame. For the PCM upstream transmitter in V.92, the values of $Y_i$ represent the number of equivalence classes associated with the $i^{th}$ phase of the data frame. Each equivalence class has one or more associated signal point magnitudes in the signal point constellation.

The problem with using the long division method in conventional systems, such as a 56 kbps based modem system, is that it requires a large number of divide operations to get to the final result. Performing binary division is typically extremely inefficient, depending on the processor used in the system. According to the V.92 recommendation in particular, MMC operations are required on the transmission operations of both server modems and client modems. Thus, now all devices that transmit data must be capable of performing MMC encoder operations to be compliant with the V.92 recommendation. The complexity of performing many division operations greatly burdens the system processors. For example, in an Intel™ Pentium™ processor, a 32-bit integer divide requires 46 cycles by the processor to perform the operation. A floating-point divide requires 39 cycles by the Pentium™ processor to perform the operation. This is in sharp contrast to other mathematical operations that can be performed on data bits in such processors.

Therefore, there exists a need in the art of modem system design to develop devices and methods for more efficiently performing multiple modulus conversion calculations. As will be seen, the invention accomplishes this in an elegant manner.

SUMMARY OF THE INVENTION

A method and device are provided for use in a communication system having means configured to map frames of information bits onto predetermined communication signal parameters that allow computation of multiple modulus conversion (MMC) outputs using little or no division operations. The invention enables the representation of an input as a plurality of sub-quotients, the performing of a multiplication operation to multiply at least one of the sub-quotients by a multiplicand and the determining of an index value associated with the multiplicand, the index value being responsive to the inverse modulus multiplication operation. Unlike conventional methods, instead of using burdensome division operations, multiplication and logical shift operations are used to produce pseudo-quotients and pseudo-remainders, which may be corrected in a final step to produce correct MMC outputs. This allows for more efficient implementation, since division is typically less efficient than multiplication and logical shift. The method and device operate on MMC inputs that may be partitioned into sub-quotients of varying numbers of digits in any numbering system.

DETAILED DESCRIPTION

Figure 1:
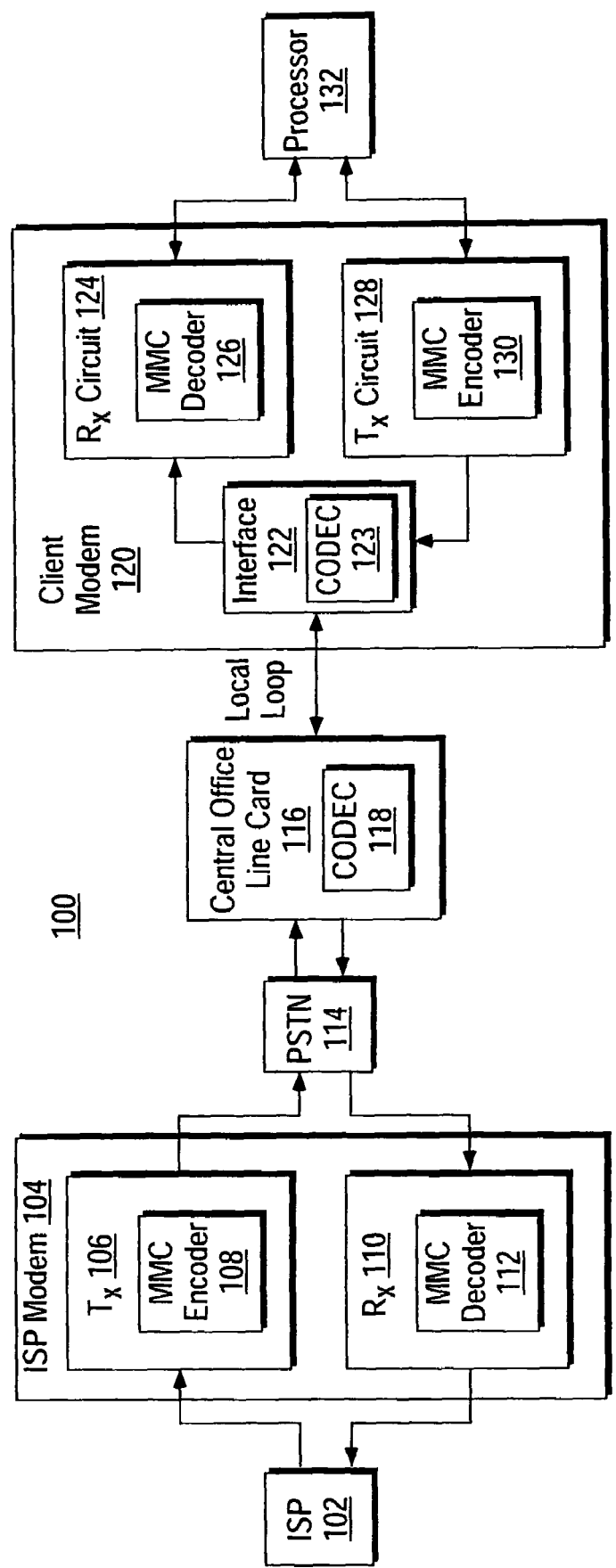
FIG. 1 is a diagrammatic view of a modem system configured with MMC encoders according to the invention.

Briefly, the invention provides a device and method for performing multiple modulus conversion using a new method of inverse modulus multiplication. It is a well known fact in mathematics that division by a number is equivalent to multiplication by the inverse of that number. However, practical systems that implement MMC operations are always limited to finite precision, and are generally not able to represent the exact inverses of all the moduli to be used. Therefore, it is generally not possible to get the correct quotients and remainders using straightforward multiplication operations. The invention provides a way to correct errors in the final remainders, without requiring corrections after each multiplication operation. The invention is described below in the context of an implementation in a modem communication environment. However, the invention is intended to have broader application, and is not limited by the embodiments described herein, and the scope of the invention is defined by the claims below and their equivalents.

The method includes receiving an integer represented as a data input having a number of digits. The digits are then represented as a number of sub-quotients. At least one multiplicand is obtained, which is related to the estimated inverse of a modulus value. As described above, the modulus is typically a positive integer $\geq 2$. The inverse modulus is calculated in finite precision, so it may not be exactly equal to the true inverse of the modulus. Next, inverse modulus multiplication is performed by multiplying the inverse modulus by the individual sub-quotients. This step generates a "pseudo-remainder" associated with the modulus. A pseudo-remainder R' is defined by the following relationship between an input quotient $Q_i$, an output "pseudo-quotient" $Q'_o$, and a modulus Y:

$$Q_i = Q'_o * Y + R'$$

This is similar to the relationship between the true output quotient and true remainder of a division operation, except that the true remainder is required to be in the range $[0,Y)$, whereas the pseudo-remainder is not. Due to possible error in the estimate of the inverse modulus, the pseudo-remainder may be outside of this range. Therefore, an additional step may be used to check the pseudo-remainder, and adjust it if it falls outside the valid range. As mentioned above, only some of the multiplication operations require this check. The multiplication operations that must have this check are those corresponding to the least significant sub-quotients. The other multiplication operations may or may not have the check. The device may include storage for storing a plurality of moduli, for accessibility to the moduli and/or inverse moduli for the MMC calculations. The device further includes a data processor configured to represent the data digits as a number of sub-quotients, and to perform the inverse modulus multiplication method.

As discussed above, in conventional devices and methods, the MMC algorithm requires that a division operation be done for each modulus, resulting in a quotient and remainder for each modulus. According to the invention, a method and apparatus is provided to obviate the division operations by performing a series of inverse modulus multiplications. These multiplication operations require substantially less processing time than division operations, and thus greatly improve the efficiency of the MMC calculation operations.

In general, multiplication is more efficient on a DSP than division. For example, in practice, multiplication by a DSP employing the invention may require as few as a single cycle to multiply two 16-bit numbers. Division of a 16-bit number using conventional DSP methods requires 1 cycle for each bit in the dividend. As a result, at least 16 cycles would be required for 16-bit dividends. In a system using the Intel™ Pentium™ processor, integer multiplication requires only 10 cycles. Using newer Pentium™ processors with MMX instructions, integer multiplication can take even fewer cycles. As discussed above, integer division in the same processor requires 46 cycles, and a floating point divide requires 39 cycles. On these types of platforms, MMC calculations performed according to the invention are much more efficient. MMC processes performed according to the invention require little or no division operations, and therefore consume less processing time.

In one embodiment of the invention, the moduli values $Y_i$ are stored in a table located in a storage location accessible in or by the device. The inverse moduli values are calculated using a division operation each time before performing the inverse modulus multiplication. In another embodiment of the invention, the moduli values $Y_i$ are stored in a first table, the inverse moduli are calculated at the beginning of a communication session using division operations, and the inverse moduli are stored in a second table for use throughout the communication session. In yet another embodiment of the invention, the inverse estimates for all possible moduli may be pre-calculated and stored in a first table. At run-time, the moduli values $Y_i$ are stored in a second table. At the beginning of a communication session, the inverse moduli are obtained by taking the values at $Y_i$ offset from the beginning of the first table, and stored in a third table. The inverse moduli values can then be used to convert the data inputs to index values throughout the communication session. Thus, a device embodying the invention may perform MMC conversion operations with little or no division operations.

Referring to FIG. 1, a diagrammatic view of a 56 kbps communication system 100 embodying the invention is shown. The figure illustrates the data paths between two devices configured with modems for sending and receiving data symbols according to the invention. Server equipment such as that operated by an Internet service provider (ISP) 102, communicates within the communication system via ISP modem 104, also known in the art as a server modem. The ISP modem includes a transmission circuit (Tx) 106 for transmitting frames of data through the system to receiving devices. The Tx includes a MMC encoder circuit 108 for performing MMC operations with inverse modulus multiplication according to the invention. The ISP modem further includes receiving circuit (Rx) 110 configured to receive frames of data from other transmission devices. The Rx circuit includes MMC decoder circuit 110 configured to decode transmissions of data frames destined for the ISP.

The ISP is digitally connected to the public switched telephone network (PSTN) 114 via the ISP modem 104. The PSTN communicates through a central office 116 that typically includes a CODEC 118 for processing pulse code modulated (PCM) signals. These signals are transmitted to and received from devices communicating with the PSTN, such as the client modem 120, via a local loop. The client modem is typically an analog modem housed in a personal computer, laptop, personal data device (PDA), or other device configured to communicate with the PSTN. The client modem includes interface 122 that communicates with the local loop to transmit and receive communications to and from the PSTN 114 via the line card 116. The interface is configured to route the received signals to the client modem's receiver circuit (Rx) 124. The receiver circuit includes an MMC decoder circuit 126 configured to decode incoming frames of data. The interface also routes outgoing signals from the transmission circuit 128, which includes an MMC encoder 130. According to the invention, the MMC encoder is configured to perform MMC operations, much like the ISP modem's MMC encoder 108. Both the Rx and Tx circuits communicate with a processor 132. The processor may be a DSP that is integrated as part of a modem card and that is configured to process data received by the client modem.

It will be appreciated by one skilled in the art that the system illustrated in FIG. 1 is applicable to the PCM upstream mode of the V.92 recommendation. As discussed above, the V.90 recommendation requires that the server modem only be capable of performing MMC encoder operations for the mapping algorithm. V.92 PCM upstream mode requires that both client and server modems be capable of performing MMC encoder operations. The MMC operations addressed by the invention may be utilized on either a server modem or a client modem.

Figure 2:
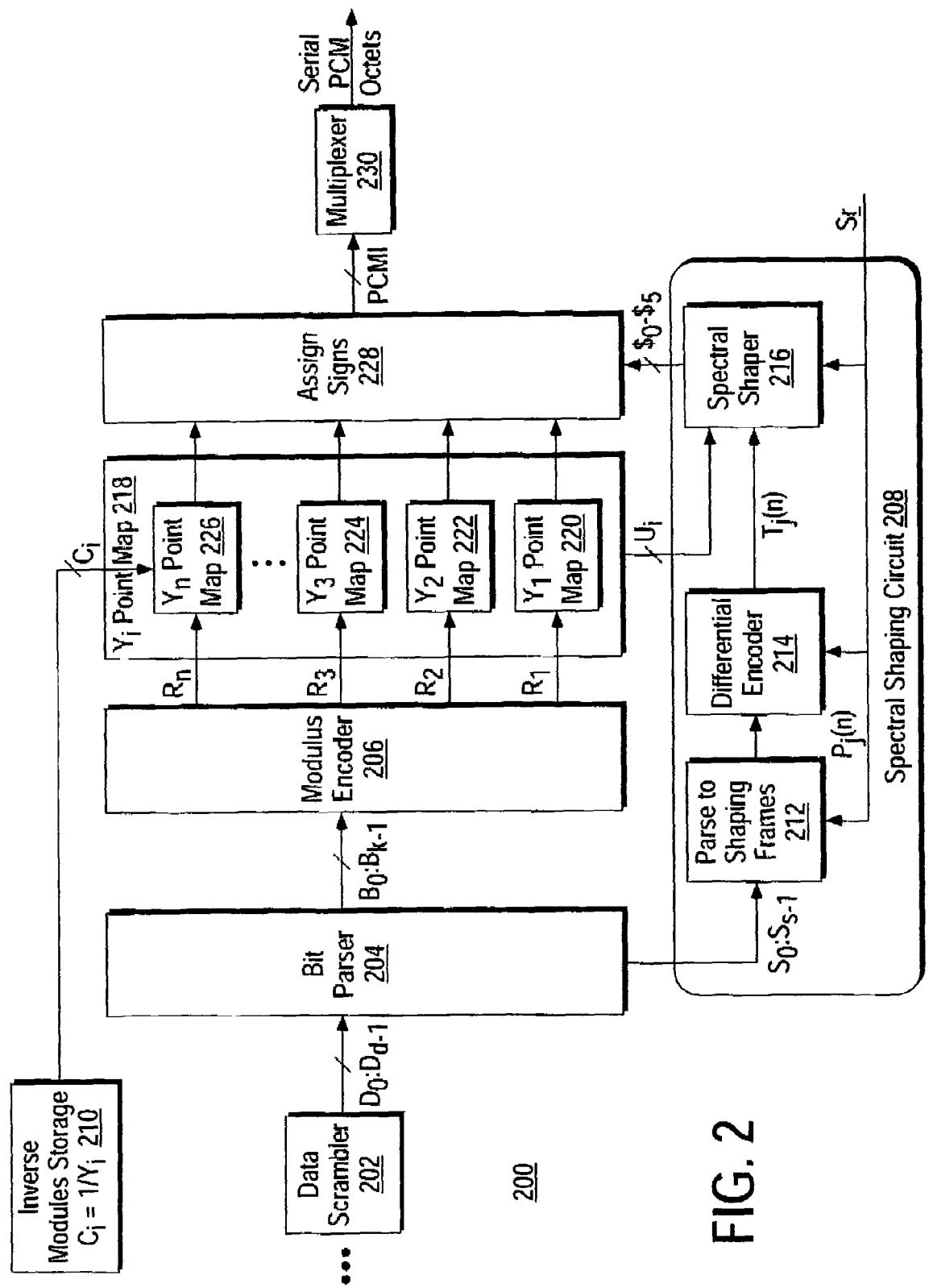
FIG. 2 is a diagrammatic view of certain modem hardware according to the invention.

Referring to FIG. 2, a more detailed diagrammatic view of a modem encoder 200 incorporating the MMC encoder 108 is illustrated. This particular example is modeled after the encoder used for V.90/V.92 downstream transmission. Data $D_0$: $D_{d-1}$ is transmitted from the data scrambler 202 to bit parser 204. The bit parser transmits the scrambled bits $B_0$: $B_{k-1}$ to the modulus encoder 206 and bits $S_0$: $S_{s-1}$ to the spectral shaping circuit 208.

The invention is directed to the MMC conversion process, which is not dependent on values generated in the spectral shaping circuit 208, and may occur in the generation of data frames for either upstream or downstream transmissions depending on which standard is used, whether it be V.90, V.92, or other future recommendations. Accordingly, the invention is not limited to any particular standard configuration, and may be adapted to any number of configurations and applications. In this example, the MMC encoder does not operate on all the bits to be transmitted. The invention may be directed towards this situation, as well as others where the MMC encoder does operate on all the bits to be transmitted.

The encoding circuitry further includes inverse modulus storage 210 configured to store inverse modulus values. Inverse modulus values are derived from modulus values. These modulus values may be determined during an adaptive initialization process between the ISP modem and the client modem. Accordingly, the signal parameters for the constellations associated with the moduli may also be established during initialization. The manner in which modulus values are selected depends on a number of factors. For example, the number of modulus values may vary depending on the application. In the V.90 and V.92 recommendations, for example, 6 PCM symbols generated from 6 moduli are required for each data frame for downstream transmissions. Unlike V.90, however, V.92 requires MMC conversion for upstream transmissions, where each data frame is comprised of 12 PCM symbols, therefore 12 moduli are required. The invention is not restricted to a particular number of moduli, or to any particular moduli values.

In one practical implementation embodying the invention, each modulus is converted to an inverse value. Thus, each division by $Y_i$ is transformed to a multiplication operation by an estimate of $1/Y_i$. This value is used to encode the data symbols into index values. In a preferred embodiment, the input integer $Q_0$ is limited to $N_1$ digits in a Base B number system, the input moduli $Y_i$ are all limited to $N_2$ digits in said number system, and the inverse moduli are all limited to $N_3$ digits in said number system. Typically, $N_3$ is the maximum number of digits that the device responsible for MMC can handle in one operation. As discussed previously, $Q_0$ typically has more digits than this maximum, so $N_1$ is greater than $N_3$. Also, in a preferred embodiment, $N_3$ should be greater than $N_2$.

To limit the inverse estimate to a $N_3$ digit representation in the base B numbering system, the $1/Y_i$ estimate is calculated by the following floor function:

$C_i$=floor($B^{N3}/Y_i$)

The resulting value $C_i$ has $N_3$ digits, and can be interpreted as a fixed point fraction with all digits to the right of the fixed point. Note that this calculation only applies if $Y_i \geq 2$. If the value of $Y_i=1$ is to be allowed, it can be handled by one of two methods. In the first method, $C_i$ is set to $B^{N3}-1$, and the inverse modulus multiplication method is used directly. In the second method, the inverse modulus multiplication method is skipped for $Y_i=1$, and the values of $Q_i$ and $R_i$ are set to $Q_i=Q_{i-1}$, and $R_i=0$.

Still referring to FIG. 2, according to the invention, in operation, upon establishing modulus values and corresponding inverse modulus values, the modulus encoder 206 may summons a look-up table stored in inverse modulus storage 210. An inverse modulus value may then be retrieved for conversion of symbols representing an integer into index values. Each of these index values may then be transmitted to point map circuitry 218, where each index value is assigned a constellation point map 220–226. These index values can then be transmitted over the PSTN to a receiving device, such as a client modem. A system may generate any number of index values, depending on the application. In V.90 and V.92, up to six index values are produced and transmitted from an ISP. The index values are then transmitted to sign assignment circuit 228 to establish the polarity of the index values. The assignment circuit outputs $PCM_i$ symbols to the multiplexer 230, which outputs PCM octets of symbols in a serial manner for transmission to a client modem.

It will be understood by those skilled in the art, that the configuration illustrated in FIG. 2 is an example of a circuit designed for a server modem. Such a server modem, according to the V.90 and V.92 recommendations, is required to perform spectral shaping functions and other features that are particular to server modem features. The MMC process, however, is equally applicable to client modems for transmitting symbols mapped using the MMC process as described above. In operation, such a client modem would include a modulus encoder similar to the modulus encoder 206 in the ISP modem, for performing MMC operations including the new inverse modulus multiplication method according to the invention.

Figure 3:
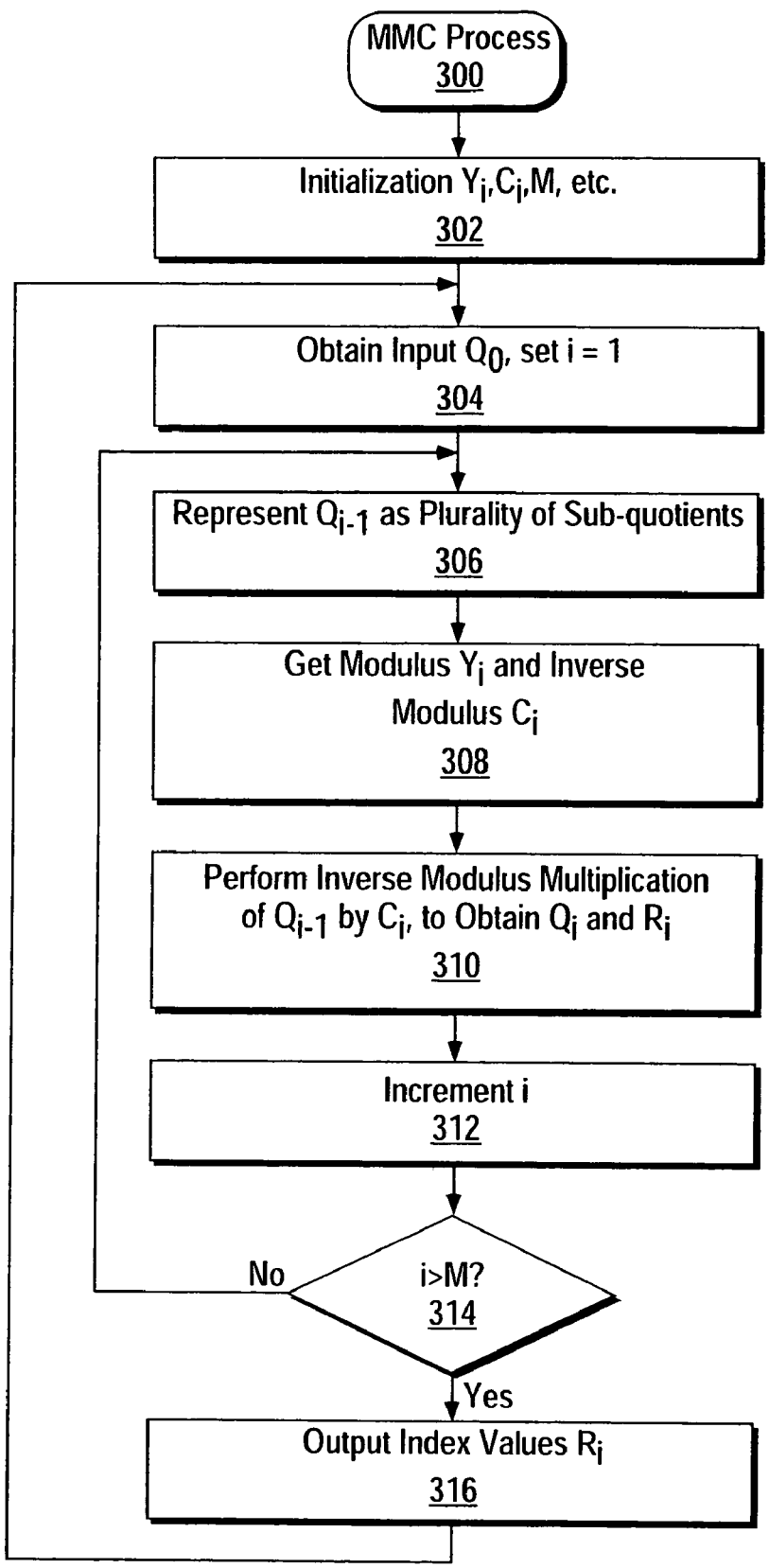
FIG. 3 is a flow diagram illustrating the MMC process according to the invention.

Referring to FIG. 3, an MMC conversion process 300 configured according to the invention is illustrated. First, initial MMC parameters are obtained in step 302. Such parameters may include number of MMC bits per frame, the bit length for either all of the sub-quotients or all but the most significant of the sub-quotients, the number of segments to be utilized in the partitioning of the bits, the number, M, of moduli or inverse moduli, and the values of the actual moduli, $Y_i$, or inverse moduli, $C_i$. A modulus encoder in step 304 obtains an input of data bits $Q_0$, and initializes a modulus index counter i. In the next step 306, the input value of the data bits is represented as a number or plurality of sub-quotients. The total number of sub-quotients is k+1. The operation of dividing the data bits into sub-quotients may be performed by performing a bit masking routine, for example, to assign portions of the data bits to a predetermined number of storage locations. The operation may also simply access storage locations associated with $Q_{i-1}$ to obtain sub-quotients of a predetermined length. These sub-quotients may or may not be of equal length. In a preferred embodiment, all but the most significant sub-quotient are of equal length. In general, the relationship of the input quotient $Q_0$ to the sub-quotients $Q_{0,i}$ is as follows: $Q_0 = Q_{0,0} + Q_{0,1} * B^{n(0)} + \ldots + Q_{0,k} * B^{n(0)+n(1)+\ldots n(k-1)}$, where n(j) represents the number of digits in the $j^{th}$ sub-quotient. The current modulus and inverse modulus values are obtained in step 308. The inverse modulus may be obtained in step 308 from a look-up table stored in a storage device, or may be obtained, computed or otherwise generated from a modulus value obtained by other means. The current quotient, $Q_{i-1}$, is then multiplied in step 310 by the inverse modulus value, using the inverse modulus multiplication method of this invention. A new quotient $Q_i$ and a remainder $R_i$ are derived from this operation. The remainder is one of the outputs of the SMC process. In step 312, the modulus index counter i is incremented. In step 314, a query is posed of whether the last modulus value has been used to convert the input data. If it has not, the output quotient is then returned back to step 306 and associated with the next consecutive modulus value, and the process is repeated. If the last modulus value has been processed, then the process proceeds to step 316 where the final remainder values are output, which are the values of $R_1$ through $R_M$ output by the modulus encoder 206 of FIG. 2. The process then returns to step 304, where the next input is obtained.

Figure 4:
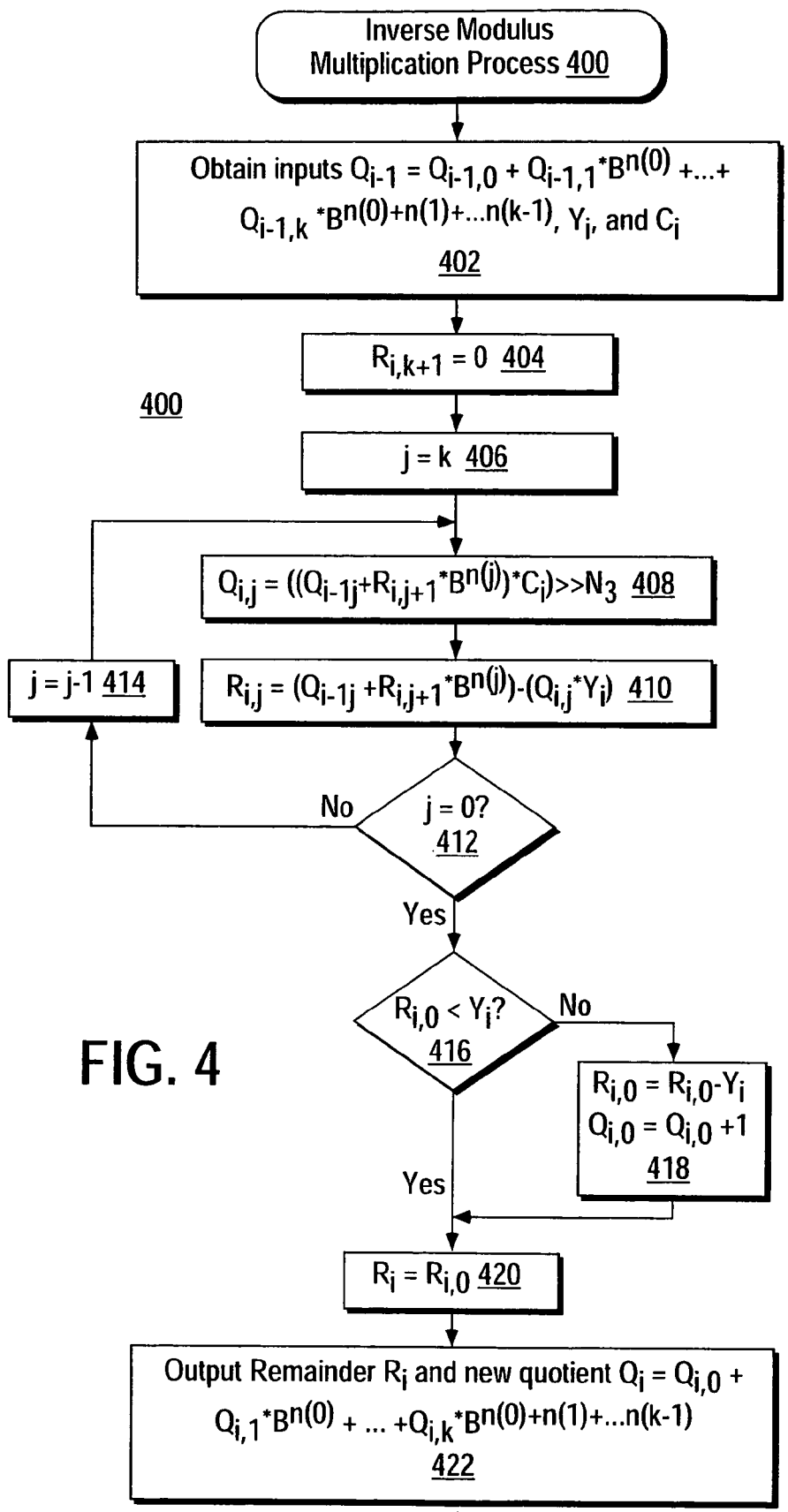
FIG. 4 is a flow diagram illustrating the inverse modulus multiplication in pseudo code according to the invention.

Referring to FIG. 4, a flow diagram is shown illustrating an inverse modulus multiplication process 400 according to the invention in pseudo code. The process illustrated is equivalent to step 310 of FIG. 3. In step 402, the quotient $Q_{i-1}$ represented as k+1 sub-quotients, the modulus $Y_i$, and the inverse modulus estimate $C_i$ are obtained. The value of $C_i$ is defined by the floor function described above. In the inverse modulus multiplication process, each sub-quotient has associated with it a pseudo-remainder and a pseudo-quotient, as described previously. For simplicity in the following discussion, no distinction is made in the notation between true remainders and pseudo-remainders, or true quotients and pseudo-quotients. In general, all the intermediate $R_{i,j}$ and $Q_{i,j}$ values in the process are pseudo-remainders and pseudo-quotients, unless the check has been performed and the values corrected as necessary. The initial value of the pseudo-remainder is set at 0 in step 404, since the initial input quotient has no remainder. In step 406, the sub-quotient index j is initialized to k, one less than the total number of sub-quotients received in step 402. The process then proceeds to the loop comprising steps 408, 410, 412, and 414, where the sub-quotients representing the output pseudo-quotient $Q_i$ are obtained from the inverse modulus multiplication operation. In step 408, the $j^{th}$ sub-quotient of the output pseudo-quotient $Q_i$ is obtained. First, the pseudo-remainder of the previous sub-quotient operation $R_{i,j+1}$ is multiplied by B, the base number system, to the power of n(j), the length of the original $j^{th}$ sub-quotient. The result is added to $Q_{i-1,j}$, the $j^{th}$ sub-quotient of the input quotient. The result of this addition is then multiplied by the inverse modulus estimate $C_i$. Finally, the result of this multiplication is logically shifted to the right by $N_3$ base B digits, as represented by the ">>" operator. The result is effectively truncated, so that only the integer part of the quotient is left. In a typical implementation, this truncation is inherent in the logical shift operation. In step 410, the pseudo-remainder of the $j^{th}$ sub-quotient inverse modulus multiplication operation is obtained. First, the $j^{th}$ sub-quotient of the output pseudo-quotient $Q_{i,j}$ is multiplied by the modulus value $Y_i$. The result is subtracted from the sum of the $j^{th}$ sub-quotient of the input quotient, $Q_{i-1,j}$, and the product of the pseudo-remainder of the previous sub-quotient operation, $R_{i,j+1}$, and B to the power of n(j). In step 412, the value of j is queried to see if it is 0. If not, the process continues with step 414, where j is decremented. After decrementing j, the process proceeds to step 408 to process the next sub-quotient. If in step 412 j is equal to 0, the process proceeds to step 416. Due to possible inaccuracy in the inverse modulus estimate $C_i$, the final sub-quotient pseudo-remainder $R_{i,0}$ may be greater than or equal to $Y_i$. As stated earlier, MMC requires that the remainders be strictly less than $Y_i$. In step 416, the value of $R_{i,0}$ is queried as to whether it is less than $Y_i$. If not, then the process proceeds to step 418. In step 418, the final pseudo-remainder is corrected by subtracting the value of the modulus $Y_i$ from it. The last sub-quotient of the pseudo-quotient $Q_{i,0}$ is also corrected by adding 1 to it. Once the true remainder and true quotient are obtained, either by passing the query in step 416 or after the correction in step 418, the process continues with step 420. In step 420, the true remainder for the final sub-quotient is copied to the output remainder $R_i$. Next, in step 422, the output remainder and output quotient represented by sub-quotients are returned by the process 400.

In order for the inverse modulus multiplication process to work correctly, certain constraints must be met related to the length of the sub-quotients, the values of the moduli, and the precision of the inverse moduli estimates. Some of these constraints are inherent to the algorithm, and others may be system dependent.

The main algorithmic constraint results from the assumption that the final pseudo-remainder obtained in step 410 when j=0, before correction in step 418, falls in the range $0 \leq R_{i,0} < 2*Y_i$. It can be shown that to meet this condition, it is sufficient to satisfy the following inequality:

$$N_3 > N_2 + n(j)$$

To express the condition in words, the number of digits used in the inverse modulus estimate must be larger than the sum of the number of digits in the largest modulus and the number of digits in the longest sub-quotient. There are some exceptions to this rule to be noted. First, the rule does not apply to the length n(k) of the first (most significant) sub-quotient, $Q_{i,k}$. This is because $R_{i,k+1} = 0$. In this case, it can be shown that the algorithmic constraint is as follows:

$$n(k) \leq N_3$$

Another exception to the algorithmic constraint is the case of $Y_i = B^{N_2}$. Although $Y_i$ has more than $N_2$ digits, the inverse modulus estimation error is 0 as long as $N_2 \leq N_3$. So, where the $N_2$ calculated from the algorithmic constraint would normally imply that $Y_i < B^{N_2}$, taking into account the exceptional case, the real constraint is $Y_i \leq B^{N_2}$.

When the algorithmic constraints are violated, the pseudo-remainders, $R_{i,j}$, can no longer be guaranteed to fall in the range $[0, 2*Y_i)$. Therefore, the range check, as performed in step 416 of FIG. 4, may need to be performed multiple times. As the pseudo-remainders become larger, the sub-quotients, $Q_{i,j}$, calculated in step 408 of FIG. 4 also become larger, and substantially more digits may be required to store the intermediate sub-quotients than were required to store the input sub-quotients. Typically, this means the number of digits, n(j), in the input sub-quotients must be fewer than if the algorithmic constraint described above were used. Since the use of smaller sub-quotients typically means that more sub-quotients are needed to represent a given input (i.e., k must be larger), this may increase the number of calculations required. So, there is a tradeoff between the number of digits, $N_3$, used to store the inverse modulus estimates, $C_i$, and the number of calculations required to perform the inverse modulus multiplication process. In a practical system where it makes sense to violate the algorithmic constraint described above, a minor variation of the invention may be used to get the MMC outputs. This variation consists of performing the range check, as in step 418 of FIG. 4, continuously until the pseudo-remainder, $R_{i,0}$, falls in the range $[0,Y_i)$. In this variation, the arrow from step 418 to step 420 is removed, and an arrow from step 418 back to step 416 is added.

In a practical system, the values of $N_2$, $N_3$, and n(j) may have other additional constraints imposed upon them. For instance, in many DSP systems the inputs to multiplication operations are limited to 16 bits. In this type of system, the constraint $N_3 \leq 16$ would hold if the algorithm were to be implemented with single multiplication operations for each sub-quotient. In other systems, both the inputs to and the products of multiplication operations are limited to 32 bits. In such a system, the constraint $N_3+n(j) \leq 32$ would hold.

Returning to the previous example where $Q_0=933$, $Y_1=5$, $Y_2=6$, $Y_3=7$, and $Y_4=8$, assume the following constraint exists: for conventional multiplication operations, the inputs are limited to 3 decimal digits and the products are limited to 5 decimal digits. The largest number of decimal digits used for the moduli is 1, so $N_2=1$. The maximum number of multiplication input digits can be used for the inverse moduli estimates, so $N_3=3$. To satisfy the algorithmic constraint, n(j)=1 is chosen for j=0 to k−1.

Although n(k) is not limited by this constraint, it is still limited by the product constraint of 5 digits. Therefore, n(k)=1 must be chosen as well. The estimates of the inverse moduli ⅕, ⅙, ⅐, and ⅛ may be pre-computed using the formula $C_i=\text{floor}(B^{N_3}/Y_i)$, where B=10, $N_3=3$, and $Y_i=\{5, 6, 7, 8\}$. The resulting values are $C_i=\{200, 166, 142, 125\}$. In one embodiment of the invention, the resultant inverse moduli estimates are stored in a table for easy look-up access by the modulus encoder 206 (FIG. 2) to generate index values.

For contrast with the conventional method discussed above, the value of $Q_0=933$ will be converted using the MMC conversion process according to the invention. First, 933 is expressed as (9*100)+(3*10)+3.

Next, the value of $Q_0$ is effectively divided by the first modulus, $Y_1=5$. The inverse modulus estimate was calculated to be $C_1=200$. According to the invention, the first MMC value can be generated, using no division operations, as follows.

a. First, multiplying 9 by 200, gives 1800, which, according to the invention, is shifted by $N_3=3$ digits and truncated, giving a pseudo-quotient of 1. The pseudo-remainder is calculated to be 4.
b. Next, 4*10 is added to 3, giving 43.
c. Multiplying 43 by 200, gives 8600, which, according to the invention, is shifted by $N_3=3$ digits and truncated, giving a pseudo-quotient of 8. The pseudo-remainder is calculated to be 3.
d. Next, 3*10 is added 3, giving 33.
e. Multiplying 33 by 200, gives 6600, which, according to the invention, is shifted by $N_3=3$ digits and truncated, giving a pseudo-quotient of 6. The pseudo-remainder is calculated to be 3. This is the final remainder before any error check.
f. Next, according to the invention, an error check is performed to determine whether the final pseudo-remainder is greater than or equal to the first modulus of 5, or whether $3 \geq 5$. This is not the case, so no adjustment is necessary.
g. Finally, the new quotient is formed, (1*100)+(8*10)+6=186
h. The final remainder is 3.

Next, the inverse modulus multiplication method is used to effectively divide the new quotient by a second modulus, $Y_2=6$. The inverse modulus estimate was calculated to be $C_2=166$.

a. Multiplying 1 by 166, gives 166, which, according to the invention, is shifted by $N_3=3$ digits and truncated, giving a pseudo-quotient of 0. The pseudo-remainder is calculated to be 1.
b. Next 1*10 is added to 8, giving 18.
c. Multiplying 18 by 166, gives 2988, which, according to the invention, is shifted by $N_3=3$ digits and truncated, giving a pseudo-quotient of 2. The pseudo-remainder is calculated to be 6.
d. Next, 6*10 is added to 6, giving 66.
e. Multiplying 66 by 166, gives 10956, which, according to the invention, is shifted by $N_3=3$ digits and truncated, giving a pseudo-quotient of 10. The pseudo-remainder is calculated to be 6. This is the final pseudo-remainder prior to the final check.
f. Finally, according to the invention, there is a check to determine whether the final pseudo-remainder is greater than or equal to 6, or whether $6 \geq 6$. In this case, the answer is yes, so both the pseudo-quotient and pseudo-remainder must be adjusted. In this case, since the pseudo-remainder, 6, is equal to 6, the method adds 1 to pseudo-quotient, and subtracts 6 from pseudo-remainder, resulting in a quotient of 11 and a remainder of 0.
g. The new quotient is then formed, (0*100)+(2*10)+11=31
h. The final remainder is 0.

Next, the inverse modulus multiplication method is used to effectively divide the new quotient, 31, by a third modulus of $Y_3=7$. The inverse modulus estimate was calculated to be $C_3=142$.

a. Multiplying 0 by 142, gives 0, which, according to the invention, is shifted by $N_3=3$ digits and truncated, giving a pseudo-quotient of 0. The pseudo-remainder is calculated to be 0.
b. Next, 0*10 is added to 2, giving 2.
c. Multiplying 2 by 142, gives 284, which, according to the invention, is shifted by $N_3=3$ digits and truncated, giving a pseudo-quotient of 0. The pseudo-remainder is calculated to be 2.
d. Next, 2*10 is added to 11, giving 31.
e. Multiplying 31 by 142, gives 4402, which, according to the invention, is shifted by $N_3=3$ digits and truncated, giving a pseudo-quotient of 4. The pseudo-remainder is calculated to be 3.
f. Next, the final pseudo-remainder is checked to see whether it is greater than or equal to the original modulus value of 6, or whether $3 \geq 6$. This is not the case, so no adjustment is necessary,
g. Finally, the new quotient is formed, (0*100)+(0*10)+4=4
h. The final remainder is 3.

Finally, the inverse modulus multiplication method is used to effectively divide the new quotient by the fourth and final modulus, $Y_4=8$. The inverse modulus estimate was calculated to be $C_4=125$.
   a. Multiplying 0 by 125, gives 0, which, according to the invention, is shifted by $N_3=3$ digits and truncated, giving a pseudo-quotient of 0. The pseudo-remainder is calculated to be 0.
   b. Next, 0*10 is added to 0, giving 0.
   c. Multiplying 0 by 125, gives 0, which, according to the invention, is shifted by $N_3=3$ digits and truncated, giving a pseudo-quotient of 0. The pseudo-remainder is calculated to be 0.
   d. Next, 0*10 is added to 4, giving 4.
   e. Multiplying 4 by 125, gives 500, which, according to the invention, is shifted by $N_3=3$ digits and truncated, giving a pseudo-quotient of 0. The pseudo-remainder is calculated to be 4.
   f. As above, the method checks whether the final pseudo-remainder is greater than or equal to the original modulus, 6, or whether $4 \geq 6$. This is not the case, so no adjustment is necessary.
   g. The final remainder is 4.

The final outputs are 3, 0, 3 and 4, respectively. So, the inverse modulus multiplication method results in the correct MMC values, as calculated in the previous examples. Note that the inverse modulus multiplication corresponding to $Y_4$ could have been skipped, since it is known in advance that $Q_4=0$.

Now, consider the example of MMC as defined in ITU-T Recommendation V.92, to be implemented using a binary processor in which multiplication operates on 16 bit operands, producing 32 bit results. For simplicity, it is assumed that $$n(0)=n(1)= \ldots =n(k-1)=N_3-N_2-1, \text{ and } n(k)=N_3.$$

Note that $N_3-N_2-1$ is the maximum value for $n(j)$ under the previously discussed algorithmic constraint $N_3>N_2+n(j)$.

In V.92, the largest possible modulus is 128, and there are 12 moduli. However, the maximum data rate is 48 kbps. Since the MMC is done at the rate of 8000/12 per second, the maximum input length is 48000*12/8000=72 bits. This gives the following:

$B=2$ $N_1=72$ $N_2=7$ (allowing the special 8-bit case of $Y_i=128$)

$N_3=16$

The values for $n(j)$ can be derived:

$n(0), n(1), \ldots n(k-1)=8$ $n(k)=16$

To process a 72 bit input, $k=8$.

To illustrate the functioning of the above system, a communication session with the following parameters is provided:

$Y_1=0\text{x}3C, Y_2=0\text{x}3D, Y_3=0\text{x}3E, Y_4=0\text{x}3F, Y_5=0\text{x}40,$
$Y_6=0\text{x}41, Y_7=0\text{x}42, Y_8=0\text{x}43, Y_9=0\text{x}44,$
$Y_{10}=0\text{x}45, Y_{11}=0\text{x}46, Y_{12}=0\text{x}47;$ and the 72-bit input $Q_0=0\text{x}123456789\text{ABCBA}9876$, where "0x" indicates hexadecimal notation. Those skilled in the art will appreciate that hexadecimal notation is often used as shorthand for binary numbers. Note that $Q_0 < Y_1 Y_2 \ldots Y_{12}$, so the inverse modulus multiplication corresponding to $Y_{12}$ can be skipped. The 16-bit inverse modulus estimates, $C_i$, have values equal to floor($2^{16}/Y_i$), and may be calculated during the MMC process, calculated at the beginning of a communication session, or obtained in some other manner. For the given values of $Y_i$, the corresponding $C_i$ values are as follows:

$C_1=0\text{x}0444, C_2=0\text{x}0432, C_3=0\text{x}0421, C_4=0\text{x}0410,$
$C_5=0\text{x}0400, C_6=0\text{x}03F0, C_7=0\text{x}03E0,$
$C_8=0\text{x}03D2, C_9=0\text{x}03C3, C_{10}=0\text{x}03B5,$
$C_{11}=0\text{x}03A8, C_{12}=0\text{x}039B$ To perform the MMC operation according to the invention, the following C-code may be used:

```
unsigned short invmult(unsigned short *x, unsigned short y, unsigned int c);
#define M 12
#define N3 16
#define nj 8
unsigned short Y[M] = { 0x3c, 0x3d, 0x3e, 0x3f, 0x40, 0x41, 0x42, 0x43, 0x44, 0x45, 0x46, 0x47 };
unsigned short Q[8] = { 0x76, 0x98, 0xba, 0xbc, 0x9a, 0x78, 0x56, 0x1234 };
void main(void)
{
    unsigned short C[M], R[M];
    int i;
    /* Calculate inverse modulus estimates (done at beginning of session) */
    for( i=0; i<M; i++ )
        C[i] = (1<<N3)/Y[i];
    /* Calculate remainders of MMC operation using inverse modulus multiplication method */
    for( i=0; i<M-1; i++ )
        R[i] = invmult(Q, Y[i], C[i]);
    R[M-1] = Q[0];
}
unsigned short invmult(unsigned short *Q, unsigned short Y, unsigned int C)
{
    unsigned int t;
    unsigned short R;
    int i;
    R = 0;
    for(i=7;i>=0;i--) {
        t = (R<<nj)+Q[i];
        Q[i] = (t*C)>>16;
        R = t-Q[i]*Y;
    }
    if (R>=Y) {
        R -= Y;
        Q[0]++;
    }
    return R;
}
```

First, $Q_0$ is represented as sub-quotients as follows:

$Q_0=0\text{x}1234; 0\text{x}56; 0\text{x}78; 0\text{x}9A; 0\text{x}BC; 0\text{x}BA; 0\text{x}98; 0\text{x}76$ Next, inverse modulus multiplication is used to effectively divide $Q_0$ by the first modulus, 0x3C. The result of this operation, which can be confirmed by the C-code above, is as follows:

$Q_1=0\text{x}4D; 0\text{x}AC; 0\text{x}1B; 0\text{x}9C; 0\text{x}2D; 0\text{x}CF; 0\text{x}E8; 0\text{x}F0$ $R_1=0\text{x}36$ No correction is required in this step.

Next, inverse modulus multiplication is used to effectively divide $Q_1$ by the second modulus, 0x3D. The result is as follows:

$Q_2$=0x01; 0x45; 0xF7; 0x10F; 0x26; 0x85; 0x81; 0xB8

$R_2$=0x18

No correction is required in this step.

Next, inverse modulus multiplication is used to effectively divide $Q_2$ by the third modulus, 0x3E. The result is as follows:

$Q_3$=0x00; 0x05; 0x41; 0xEF; 0xBA; 0x6D; 0x82; 0x17

$R_3$=0x26

No correction is required in this step.

Next, inverse modulus multiplication is used to effectively divide $Q_3$ by the fourth modulus, 0x3F. The result before correction is as follows:

$Q_{4,0}$=0x69

$R_{4,0}$=0x40

Since $R_{4,1} \geq$ 0x3F, a correction is required. The correction is as follows:

$Q_{4,0}$=0x69+1=0x6A $R_{4,0}$=0x40−0x3F=0x01

After correction, the output of the fourth inverse modulus multiplication is as follows:

$Q_4$=0x00; 0x00; 0x15; 0x5D; 0x33; 0xB8; 0x98; 0x6A $R_4$=0x01

Next, inverse modulus multiplication is used to effectively divide $Q_4$ by the fifth modulus, 0x40. The result is as follows:

$Q_5$=0x00; 0x00; 0x00; 0x55; 0x74; 0xCE; 0xE2; 0x61

$R_5$=0x2A

No correction is required in this step.

Next, inverse modulus multiplication is used to effectively divide $Q_5$ by the sixth modulus, 0x41. The result is as follows:

$Q_6$=0x00; 0x00; 0x00; 0x01; 0x50; 0x90; 0xF7; 0xAA $R_6$=0x37

No correction is required in this step.

Next, inverse modulus multiplication is used to effectively divide $Q_6$ by the seventh modulus, 0x42. The result is as follows:

$Q_7$=0x00; 0x00; 0x00; 0x00; 0x05; 0x19; 0x77; 0x11D $R_7$=0x30

No correction is required in this step.

Next, inverse modulus multiplication is used to effectively divide $Q_7$ by the eighth modulus, 0x43. The result is as follows:

$Q_8$=0x00; 0x00; 0x00; 0x00; 0x00; 0x13; 0x7C; 0x0F $R_8$=0x30

No correction is required in this step.

Next, inverse modulus multiplication is used to effectively divide $Q_8$ by the ninth modulus, 0x44. The result is as follows:

$Q_9$=0x00; 0x00; 0x00; 0x00; 0x00; 0x00; 0x49; 0x5A $R_9$=0x27

No correction is required in this step.

Next, inverse modulus multiplication is used to effectively divide $Q_9$ by the tenth modulus, 0x45. The result is as follows:

$Q_{10}$=0x00; 0x00; 0x00; 0x00; 0x00; 0x00; 0x01; 0x10

$R_{10}$=0x0A

No correction is required in this step.

Next, inverse modulus multiplication is used to effectively divide $Q_{10}$ by the eleventh modulus, 0x46. The result is as follows:

$Q_{11}$=0x00; 0x00; 0x00; 0x00; 0x00; 0x00; 0x00; 0x03

$R_{11}$=0x3E

No correction is required in this step.

Next, since it is known in advance that $Q_{12}$=0, the final remainder, $R_{12}$, can be directly set to the next-to-last quotient, $Q_{11}$. The result is as follows:

$Q_{12}$=0x00; 0x00; 0x00; 0x00; 0x00; 0x00; 0x00; 0x00

$R_{12}$=0x03

No correction is required in this step.

Although FIGS. 3 and 4 describe an inverse modulus multiplication operation where each of the sub-quotients is processed consecutively for each modulus, the procedure may also be arranged such that each sub-quotient is processed by each modulus consecutively before proceeding to the next sub-quotient. In either case, only the pseudo-remainders corresponding to the last sub-quotient need to be corrected. The following C-code illustrates this variation of the inverse modulus multiplication method:

```
unsigned short invmult_nocheck(unsigned short Q, unsigned short *Y,
    unsigned short *C, unsigned short *R);
unsigned short invmult_check (unsigned short Q, unsigned short *Y,
    unsigned short *C, unsigned short *R);
#define M 12
#define N3 16
#define nj 8
```

-continued

```
unsigned short Y[M] = { 0x3c, 0x3d, 0x3e, 0x3f, 0x40, 0x41, 0x42, 0x43,
0x44, 0x45, 0x46,
0x47 };
unsigned short Q[8] = { 0x76, 0x98, 0xba, 0xbc, 0x9a, 0x78, 0x56,
0x1234 };
void main(void)
{
    unsigned short C[M], R[M];
    int i;
    /* Calculate inverse modulus estimates (done at beginning of
    session) */
    for( i=0; i<M; i++ )
        C[i] = (1<<N3)/Y[i];
    /* Calculate remainders of MMC operation using inverse modulus
    multiplication method */
    for( i=0; i<M; i++ )
        R[i] = 0;
    for( i=7; i>=1; i-- )
        Q[i] = invmult_nocheck(Q[i], Y, C, R);
    Q[0] = invmult_check(Q[0], Y, C, R);
}
unsigned short invmult_nocheck(unsigned short Q, unsigned short *Y,
        unsigned short *C, unsigned short *R)
{
    unsigned int t;
    int i;
    for(i=0;i<M-1;i++) {
        t = (R[i]<<nj)+Q;
        Q = (t*C[i])>>16;
        R[i] = t-Q*Y[i];
    }
    R[M-1] = Q;
    return Q;
}
unsigned short invmult_check(unsigned short Q, unsigned short *Y,
        unsigned short *C, unsigned short *R)
{
    unsigned int t;
    int i;
    for(i=0;i<M-1;i++) {
        t = (R[i]<<nj)+Q;
        Q = (t*C[i])>>16;
        R[i] = t-Q*Y[i];
        if( R[i] >= Y[i] ) {
            Q++;
            R[i] -= Y[i];
        }
    }
    R[M-1] = Q;
    return Q;
}
```

In the inverse modulus multiplication procedures described above, the pseudo-remainders for the least significant sub-quotients are checked during the procedure, and the pseudo-remainders and pseudo-quotients are modified if necessary. In another variation, the inverse modulus multiplication procedure is done without any checks, producing M pseudo-remainders. At the end of the procedure, all pseudo-remainders are then checked. At this point, it is too late to update the pseudo-quotients, since they have already been used in subsequent steps of the procedure. Instead, whenever a pseudo-remainder is reduced by $Y_i$, the next pseudo-remainder is incremented by 1. If the algorithmic constraint described above is followed, then each pseudo remainder is in the range $[0,2*Y_i)$ before the check. Since the check may result in incrementing the pseudo-remainder again, the range is expanded. Therefore, the check should be done continuously until the pseudo-remainder falls in the range $[0,Y_i)$. The following C-code illustrates this variation of the invention, using the same example inputs and moduli as used previously:

```
unsigned short invmult (unsigned short *x, unsigned short y,
unsigned int c);
#define M 12
#define N3 16
#define nj 8
unsigned short Y[M] = { 0x3c, 0x3d, 0x3e, 0x3f, 0x40, 0x41, 0x42, 0x43,
0x44, 0x45, 0x46,
0x47 };
unsigned short Q[8] = { 0x76, 0x98, 0xba, 0xbc, 0x9a, 0x78, 0x56,
0x1234 };
void main(void)
{
    unsigned short C[M], R[M];
    int i;
    /* Calculate inverse modulus estimates (done at beginning of
    session) */
    for( i=0; i<M; i++ )
        C[i] = (1<<N3)/Y[i];
    /* Calculate remainders of MMC operation using inverse modulus
    multiplication method */
    for( i=0; i<M-1; i++ )
        R[i] = invmult(Q, Y[i], C[i]);
    R[M-1] = Q[0];
    /* Check all remainders */
    for( i=0; i<M-1; i++ ) {
        while( R[i] > Y[i] ) {
            R[i] -= Y[i];
            R[i+1]++;
        }
    }
}
unsigned short invmult(unsigned short *Q, unsigned short Y,
unsigned int C)
{
    unsigned int t;
    unsigned short R;
    int i;
    R = 0;
    for(i=7;i>=0;i--) {
        t = (R<<nj)+Q[i];
        Q[i] = (t*C)>>16;
        R = t-Q[i] *Y;
    }
    return R;
}
```

Although the inverse modulus multiplication method has been presented using the floor( ) function to calculate the inverse estimate, those skilled in the art will appreciate that other estimation techniques could be used. For example, the following formula could be used:

$$C_i = \text{ceil}(B^{N3}/Y_i)$$

where the ceil( ) function is defined as the smallest integer greater than or equal to its argument. In this case, the pseudo-remainder could become negative, and the correction step becomes:

```
if( R_{i,0} < 0 )
    { R_{i,0} = R_{i,0} + Y_i
      Q_{i,0} = Q_{i,0} - 1 }
```

Another possible inverse estimate technique uses a rounding function:

$$C_i = \text{rnd}(B^{N3}/Y_i)$$

where the rnd( ) function is defined as the nearest integer to its argument. In this case, the pseudo-remainder correction technique varies based on whether the nearest integer is larger or smaller than the argument. This can be handled by performing both previously described checks every time, determining which check to perform at run-time, or predetermining which check to perform for each inverse modulus.

The invention provides a device and method for performing multiple modulus conversion using a new method of inverse modulus multiplication. The method includes receiving an integer represented as a data input having a number of digits, which are then represented as a number of sub-quotients. The inverse modulus multiplication is performed by multiplying an inverse modulus estimate by the individual sub-quotients, generating an index value associated with the modulus. Unlike conventional devices and methods that use multiple division operations to obtain index values, the invention obviates the division operations by performing a series of inverse modulus multiplications. These multiplication operations require substantially less processing than division operations, and thus greatly improve the efficiency of the MMC calculation operations. The embodiments described herein are not intended in any way limit the scope of the invention, which is established by the following claims and their equivalents.

The invention claimed is:

1. A multiple modulus conversion (MMC) method for obtaining a plurality of index values associated with a plurality of moduli, for use in a communication system configured to map frames of information bits onto predetermined communication signal parameters, the method comprising:

obtaining an input $Q_0$;

representing the input as a plurality of sub-quotients in the form of $Q_0 = Q_{0,0} + Q_{0,1}*B^{n(0)} + \ldots + Q_{0,k}*B^{n(0)+n(1)+\ldots n(k-1)}$, where $Q_{0,j}$ is the $j^{th}$ sub-quotient of the input, B is the base numbering system, n(j) is the number of digits assigned for the $j^{th}$ sub-quotient, and k+1 is the number of sub-quotients, for j=[0,k];

obtaining a multiplicand $C_i$, that is an estimate of the inverse of a whole number $Y_i$, where $Y_i$ is one of the moduli;

performing an inverse modulus multiplication operation by:

calculating at least one sub-quotient of the output pseudo-quotient corresponding to $Y_i$ according to the following formula: $Q_{i,j} = ((Q_{i-1,j} + R_{i,j+1}*B^{n(j)})*C_i) >> N_3$, where $Q_{i-1,j}$ is one of a sub-quotient from a previous calculation and a sub-quotient of the input, $R_{i,j+1}$ is the pseudo-remainder from a previous calculation, and $N_3$ is the number of digits used to represent $C_i$; and calculating a pseudo-remainder according to the following formula: $R_{i,j} = (Q_{i-1,j} + R_{i,j+1}*B^{n(j)}) - (Q_{i,j}*Y_i)$; and determining an index value associated with the modulus $Y_i$, the index value being responsive to the inverse modulus multiplication operation.

2. A method according to claim 1, wherein $C_i$ is estimated according to the formula: $C_j = \text{floor}(B^{N3}/Y_j)$, where the floor function returns the largest integer less than its argument.

3. A method according to claim 1, wherein $C_i$ is estimated according to the formula: $C_i = \text{ceil}(B^{N3}/Y_i)$, where the ceil function returns the smallest integer greater than its argument.

4. A method according to claim 1, wherein $C_i$ is estimated according to the formula: $C_i = \text{rnd}(B^{N3}/Y_i)$, where the rnd function returns the closest integer to its argument.

5. A method according to claim 1, wherein the index value is determined by:

obtaining a final pseudo-remainder $R_{i,0}$ associated with a least significant sub-quotient $Q_{i,0}$; and performing a final pseudo-remainder correction loop, wherein the value $Y_i$ is repeatedly added to $R_{j,0}$ until the result is in the range $[0, Y_i)$.

6. A method according to claim 1, wherein the index value is determined by:

obtaining a final pseudo-remainder $R_{i,0}$ associated with a least significant sub-quotient $Q_{i,0}$; and performing a final pseudo-remainder correction loop, wherein the value $Y_i$ is repeatedly subtracted to $R_{i,0}$ until the result is in the range $[0, Y_i)$.

7. A method according to claim 1, wherein the index value is determined by:

obtaining a final pseudo-remainder $R_{i,0}$ associated with a least significant sub-quotient $Q_{i,0}$; and performing a final pseudo-remainder correction loop, wherein the value $Y_i$ is alternately added and subtracted to $R_{i,0}$ until the result is in the range $[0, Y_i)$.

* * * * *